United States Patent [19]

Rivers

[11] 3,918,046

[45] Nov. 4, 1975

[54] DIGITAL TO ANALOG CONVERTER

[75] Inventor: Roy W. Rivers, Conesus, N.Y.

[73] Assignee: Xerox Corporation, Stamford, Conn.

[22] Filed: Jan. 14, 1974

[21] Appl. No.: 432,933

Related U.S. Application Data

[63] Continuation of Ser. No. 227,999, Feb. 22, 1973.

[52] U.S. Cl.................340/347 DA; 178/DIG. 28; 340/347 CC; 307/227; 328/186

[51] Int. Cl.² .......................................... H03K 13/02

[58] Field of Search ............ 307/227; 328/186, 128; 340/347 DA, 347 CC; 178/DIG. 28, 7.2, 7.7

[56] References Cited

OTHER PUBLICATIONS

Greeson, Jr. et al., "IBM Technical Disclosure Bulletin," Vol. 11, No. 7, Dec. 1968, pp. 802–803.

*Primary Examiner*—Charles D. Miller

[57] ABSTRACT

The present invention relates to an apparatus for converting a series train of pulses into an analog signal. The apparatus comprises a combination of an operational amplifier, a resistive impedance, and a storage capacitor wherein the combination is arranged to function as an integrator, and means for changing the resistive impedance from one value to another when the series train of pulses changes its state from one state to the other for modifying the RC charge time constant of the resistive impedance and storage capacitor to minimize drift in the voltage output of the operational amplifier. Where necessary the apparatus also includes means for varying the number of pulses per ramp period while maintaining the ramp output at the same or different levels.

9 Claims, 9 Drawing Figures

DIGITAL TO ANALOG CONVERTER

This is a continuation of application Ser. No. 227,999, filed Feb. 22, 1973.

This invention relates to digital-to-analog converters in general and, improved ramp function generators in particular.

Digital-to-analog converters are, of course, widely utilized for a variety of purposes. For example, in a facsimile transmission system, a scanner is used to scan across a document in successive lines at a given rate to convert the optical image into video signals which, in turn, are relied on to produce the facsimile reproduction at the receiving end. In such a system, a constant scan time interval should be maintained to assure that the image received is a good facsimile copy of the image sent. Typically, this is accomplished by digital-to-analog converters which convert a train of input pulses into a cylical staircase or ramp function which is then used to drive the scanning means.

There are a number of problems and shortcomings associated with prior art converters which heretofore have not been satisfactorily resolved. One is a temperature drift problem caused by variations in the operational characteristics of the converter. Another problem is that there usually are dissimilarities between certain of the circuit elements, such as the counters and individual current source branches in the converter, which cause distortions in the output. Still another limitation is that the converters are designed so that the number of input pulses per ramp period is fixed.

Therefore a general object of the present invention is to overcome the aforementioned shortcomings and problems of the prior art converters and, in particular, to overcome the temperature drift problem.

Another object of the present invention is to improve the overall performance characteristic of the converter and simplify its structure.

In accordance with the present invention, the foregoing and other objects of the present invention are achieved by a converter which includes a combination of operational amplifier, capacitive means and resistive means wherein the combination is arranged to integrate a train of digital pulses, and means for changing the resistance of the resistive means from one value to another for changing the integration rate of the circuit as the train of pulses changes its state from one to another.

The foregoing and other objects and features of the present invention will become clearer from the following detailed description of an illustrative embodiment of the present invention in conjunction with the accompanying drawings in which.

Figures 3A, 3B:
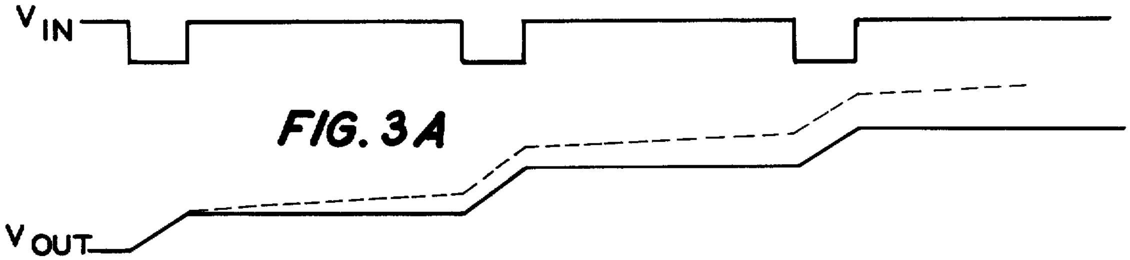
Figure 4:
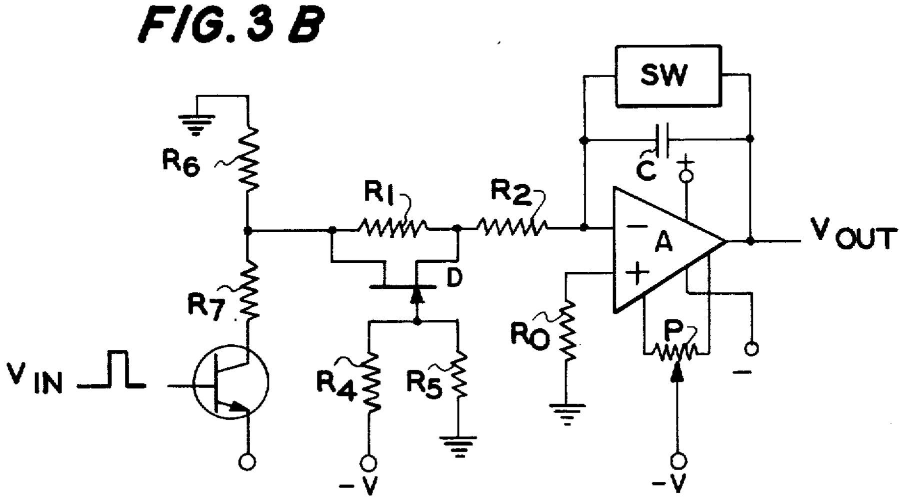
Figures 4, 5:
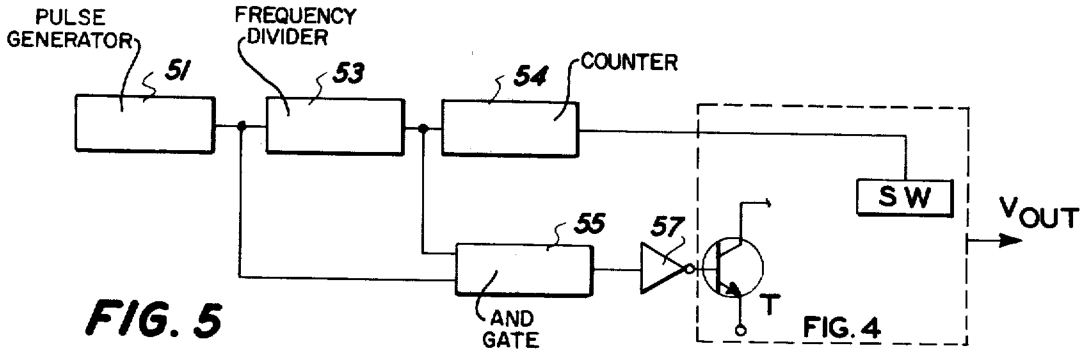
Figures 6A, 6B, 6C:
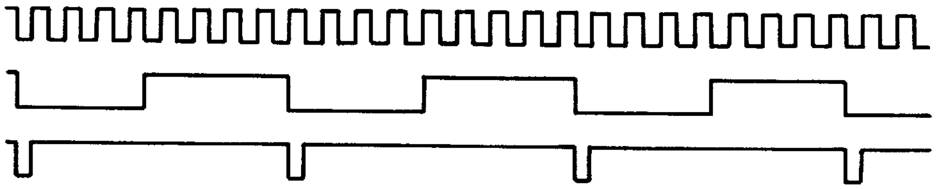

FIG. 3A and 3B respectively show the response characteristics of a converter before and after the drift caused by the change in the operating temperature thereof has been corrected in accordance with the present invention;

FIG. 4 shows an illustrative example of a converter embodying the present invention;

FIG. 5 shows a modified embodiment of the converter wherein provision has been made for varying the number of pulses that are integrated per ramp period and means for adjusting the output level of the ramp; and FIGS. 6A, 6B, and 6C show waveforms at various points of the converter shown in FIG. 5.

DETAILED DESCRIPTION

Figure 1:
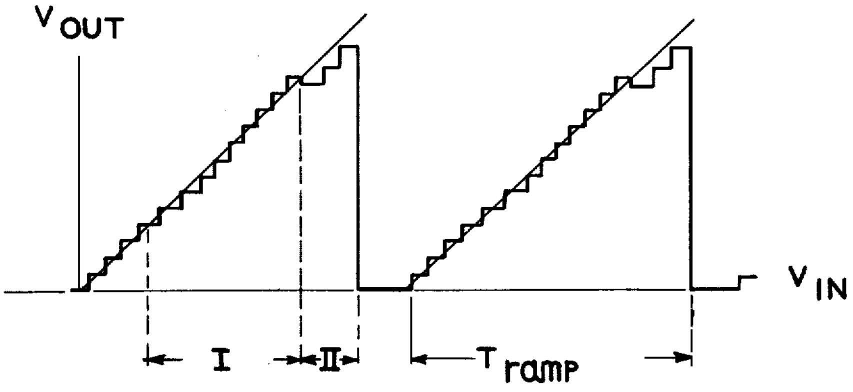
FIG. 1 shows a non-linear output waveform of a multiple input bit digital to analog converter.

Digital-to-analog converters which are characterized by having a given number of binary counters arranged to convert scually applied digital pulses into a periodic staircase output tend to have non-linear output variations. These undesirable variations are often non-monotonic, as shown in FIG. 1, where the non-linearity is assumed to divide each ramp into two more or less distinct segments I and II. The non-linearity is in part due to the variation in the characteristics of the counters used in the converter. Thus, to overcome this shortcoming, one approach would be to use binary counters having precisely the same characteristics, or certain circuit elements associated with each binary counter, to compensate for the usually unavoidable variations between the counters. Unfortunately, however, such an approach is expensive and difficult to control.

Figure 2:
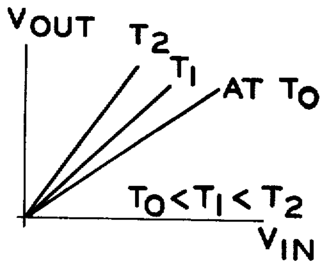
FIG. 2 shows a drift or change in the input versus output voltage characteristics at different operating temperatures of the converter.

In the present converter, an operational amplifier is provided with means to integrate a train of pulses into a periodic ramp or staircase output wave. One problem that was encountered, however, is that commerically available, moderately priced operational amplifiers generally have a dc offset voltage which tends to drift as a function of temperature as graphically shown in terms of $V_{out}$ versus $V_{in}$ for different operating temperatures $T_o$, $T_1$, $T_2$, etc. in FIG. 2. The effect of such drift is illustrated in FIG. 3B where the steps of the output voltage $V_{out}$ of the drifting converter, have, as shown in dotted lines, an appreciable slope rather than the desired essentially flat characteristic of an ideal converter, as shown in solid lines as will be appreciated the drift is cumulative and, therefore, tends to produce a significant change in the uncontrolled variation in the converter output voltage. For example, typical moderately priced commercially available operational amplifiers used as linear integrators were found to change their voltage outputs from 8.5 to 8.8 volts as they underwent a 50°F. change during the warm-up period of 10 to 15 minutes. This amounts to up to about 4% deviation in the level of output during the warm-up period compared to the final output level reached after the warm-up period. In certain applications, such as in the case of a facsimile system where the ramp output is used to drive a galvanometer to scan a modulated laser image on a photoreceptive layer, as described in detail in the copending and commonly assigned U.S. application of Peter J. Mason Ser. No. 227,938 filed on Feb. 22 1972, the thermal drift caused as much as 3 to 5% drift in the rotational angle of the rotary member of the galvanometer. This caused a substantially corresponding amount of variation in the scan width and consequently a significant level of distortion in the facsimile output.

Underlying the present invention is the discovery that the thermally induced drift occurs largely during the "OFF" time interval between successive input pulses. Accordingly, in keeping with this invention, provision is made for virtually eliminating any tendency for the output of the operational amplifier to drift during the OFF time intervals. Referring to FIG. 4, in accordance with the present invention, this is accomplished by providing a converter which comprises an operational amplifier A, capacitive means C, resistive means for applying a series train of input pulses to the operational amplifier, and means for changing the input resistance to the amplifier to a higher value during the intervals between the pulses. The operational amplifier A is adjusted at a certain operating level by applying a DC voltage source -V via a potentiometer P in a suitable manner. Further, the operational amplifier A has its non-inverting input terminal returned to ground through a resistor $R_0$ and its inverting input coupled by the resistance means to receive the input pulses. A storage capacitor C is connected between the output and inverting input terminals of the operational amplifier A, and a suitable reset switch SW of a conventional design is connected in the manner shown in shunt with the capacitor C so that the charge stored in the capacitor C may thereby be discharged to reset the converter for successive cycles operation.

The input resistance to the amplifier A comprises a pair of resistors $R_1$ and $R_2$. One of the pair, $R_1$, is shunted by a field effect transistor FET. The FET is used here to act as a means for switching the resistor $R_1$ in and out of the path of the incoming pulses applied to the operational amplifier. The gate electrode G of the FET is biased at a constant voltage level by a pair of resistors $R_4$ and $R_5$ functioning as a potential divider and connected between the DC potential source -V and ground.

The present converter further includes an input stage which adjusts the two different states of the series train of input pulses into two different potential levels that will turn the FET on and off. For example, the input stage is in the form of a switching network which includes a transistor T and a pair of potential dividing resistors $R_6$ and $R_7$ connected in series to the collector thereof so that these elements form a common emitter switch, as shown in FIG. 4. In such a network the input train of pulses is applied to the base electrode of the transistor T, as shown. The source electrodes of the FET and the resistor $R_1$ of the resistive means are connected to the junction between the two potential dividing resistors $R_6$ and $R_7$. The drain electrode D of the FET is connected to the junction between the two resistors $R_1$ and $R_2$.

As arranged, the overall circuitry acts as an integrator, and the storage capacitor C and the coupling resistors $R_1$ and $R_2$ provide a RC time constant governing the speed of integration. The error in terms of the voltage drift ($V_{offset}$) can be expressed mathematically:

$$V_{out} = \frac{V_{offset}}{RC} t$$

where

- $t$ is the OFF time interval between the successive pulses multiplied by the number of input pulses multiplied by the number of input pulses per ramp period
- $V_{offset}$ is the offset voltage of the operational amplifier,
- $R$ is $R_1 + R_2$, and
- $C$ is the capacitor C.

To eliminate, or at least materially reduce the R term is electronically increased during the pulse OFF times so that the effective resistance R is substantially greater (say, 30 times greater) during the OFF time intervals than during the ON time intervals. This is done by selectively inserting and removing $R_1$ from the path of the incoming signal applied to the operational amplifier A. More particularly, the field effect transistor FET is switched into and out of conduction to thereby effectively remove and insert the resistor $R_1$ during the ON time intervals and the OFF time intervals, respectively. Specifically, the transistor T is switched into conduction in response to each pulse applied to its base electrode. The resistances $R_6$ and $R_7$ are adjusted so that, when transistor T conducts, the input $V_{in}$ applied to and the source electrode of the FET is substantially equal to the voltage applied to the gate electrode G of FET by the potential divider $R_4$ and $R_5$, with the result that the FET is then switched into conduction. When the FET conducts, the intrinsic resistance of about 100 ohms between its source S and the drain electrode D is applied in shunt with resistor $R_1$. With $R_2$ fixed at a very high value, 10,000 ohms, for example, the FET in effect shorts out resistor $R_1$.

When the transistor $T_1$ is in its non conductive state, the source electrode of the FET is held essentially to ground. Thus, during the time interval between successive pulses, the FET is turned off and $R_1$ is inserted in the signal path. Consequently, the FET acts as an open switch and causes the internal impedance across the source S and drain electrode D of FET to become infinite during the OFF time interval. In this manner the resistors $R_1$ and $R_2$ are inserted into the signal path between the input and the inverting electrode of the operational amplifier A during the OFF time interval $t$, of the input pulses.

From the foregoing, the voltage output $V_{out}$ can be expressed generally as follows:

$$V_{out} \quad \frac{V_{in}}{(R)} t$$

where R is an electrically controlled variable.

In the absence of an input, or during the time intervals between the pulses, the transistor T does not conduct, and this turns the FET OFF. During the OFF time interval, t, the voltage output becomes:

$$V_{out} = \frac{V_{in}}{(R_1 + R_2)C} t_1 \qquad (2)$$

where $t_1$ is the OFF time interval multiplied by the number of pulses per converter cycle.

In the presence of an input pulse, the transistor T conducts and this turns the FET ON. During the ON time interval the voltage output becomes:

$$V_{out} \quad \frac{V_{in}}{(R_{s\text{-}d} + R_2)C} t_2 = \frac{V_{in}}{R_2} \qquad (3)$$

where

- $t_2$ is the ON time interval multiplied by the number of pulses per converter cycle.
- $R_{s-d}$ is the effective source-to-drain resistance of the FET when it is in its conductive state (approximately 60 ohms). Typically $R_{s-d} << R_2$ with the result that, $R_{s-d}$ may generally be disregarded.

The efficacy of the present invention has been demonstrated using the following components in a converter for driving a scanner:

| | |
|---|---|
| Operational amplifier A | 741 |
| FET | 2N5639 |
| Potentiometer P | 10K |
| Transistor T | 2N3904 |
| Voltage V | ±15 volts |
| C | 0.22 ufd |
| Switch SW | 2N5639 |
| $R_0$ | 300K ohms |
| $R_1$ | 300K ohms |
| $R_2$ | 10K ohms |
| $R_4$ | 120K ohms |
| $R_5$ | 120K ohms |
| $R_6$ | 390 Ω ohms |
| $R_7$ | 390 Ω ohms |

per ramp, with each of the pulses having 2,100 There were 1024 pulses per ramp period and each such pulse had an ON time of 2.7 microseconds and an OFF: time of 313 microseconds. It was found that the inclusion of the FET and the resistor $R_1$ reduced the deviation in the scan width from 0.35 inch to just 0.01 inch based on a nominal scan width of 8.5 inch.

Various modifications may, of course, be made without departing from the present invention. For example, a frequency divider 53, a counter 54 an AND gate 55, and an inverter 57 may be used with the basic converter (FIG. 4) to permit the number of pulses integrated per ramp period to be easily adjusted. Specifically, the periodic pulses provided by a suitable pulse generator 51 are applied to the frequency divider 53 so that there are two pulse trains; one (FIG. 6_a_) having a repetition rate as determined by the pulse generator 51, and the other (FIG. 6_b_) having a repetition rate reduced from that of the first pulse train by a preselected factor as determined by the frequency divider 53. The pulses from the divider 53 are applied to a counter 54 and to one input of the AND gate 55 is connected to the output of the pulse generator 51 and, thus, the gate 55 is enabled during the ON time of each pulse from the divider 53 to pass a burst pulses from the pulse generator 51 to the base of the transistor T via the inverter 57. The counter 54, on the other hand, provides reset pulses (FIG. 6_c_) to actuate the reset switch SW in the converter (FIG. 4) after a predetermined number of pulses have been received from the divider 53. Accordingly, it will be understood that the number of pulses integrated per ramp period can be varried by adjusting the counter 54. Moreover, it will be appreciated that the number of pulses integrated per ramp period determines the duration of each ramp. Preferably, of course, the reset pulses (FIG. 6_c_) provided by the counter 54 have a duration sufficient to insure that the storage capacitor C in the converter fully discharges between successive ramps. It should, therefore, be understood that the period of reset pulses may be predetermined multiple of the period of the pulses provided by the pulse generator 51, with the multiple being selected to insure that the capacitor C is, in fact, fully discharged between successive ramps.

Where necessary the maximum output voltage level at the end of the ramp wave can be adjusted to a particular level by adjusting the resistance $R_2$ connected to the input of the operational amplifier A. For example, the output level can be maintained at the same level while doubling the number of pulses being integrated into a ramp wave and thereby doubling the ramp period by doubling the resistance value of the resistors $R_2$ and doubling the pulse count by the counter 54 per ramp period.

Various other modifications and changes may be made to the illustrative embodiment of the present invention described above without departing from the spirit and scope of the present invention as set forth in the accompanying claims:

What is claimed is:

1. A converter for converting a train of input pulses having a predetermined repetition rate into a staircase ramp function comprising the combination of an operational amplifier having an inverting input terminal and an output terminal, a frequency divider responsive to said input pulses to provide a second train of pulses at a selected repetition rate, a counter coupled to said frequency divider for providing reset pulses in response to successive segments of said second train of pulses, with each of said segments comprising a predetermined number of pulses, a resistive means coupled to the inverting input of said operational amplifier, a gate having one input coupled to receive said input pulses, a second input coupled to receive said second train of pulses, and an output coupled to said resistive means for applying said input pulses to said operational amplifier via said resistive means in bursts reoccurring at said second repetition rate, a capacitive means coupled between the inverting input and output terminals of said operational amplifier for integrating the pulses applied to said operational amplifier, first switch means connected to said capacitive means and responsive to said reset pulses for discharging said capacitive means after a predetermined number of input pulses have been integrated thereby, and second switch means coupled to said resistive means and responsive to the pulses applied to said operational amplifier for significantly reducing the resistance of said resistive means in response to each pulse applied to the operational amplifier.

2. The converter according to claim 1 wherein said counter is selected to establish a desired period for said ramp function.

3. The converter according to claim 1 wherein the resistance of said resistive means is reduced by said second switch means from a relatively high level selected to materially reduce any tendency for the output of said operational amplifier to drift to a lower level selected to set a desired maximum amplitude for said ramp function.

4. A digital to analog converter for providing a ramp-like signal in response to a train of input pulses, with each of said pulses having a predetermined ON time and a predetermined OFF time; said converter comprising the combination of an operational amplifier means having an input terminal and an output terminal, a first resistive means coupled to apply said pulses to said input terminal, a capacitive means coupled between said input and output terminals for integrating said pulses, a second resistive means, and switch means coupled in parallel with said second resistive means to form a parallel circuit; said parallel circuit being coupled in series with said first resistive means for providing said operational amplifier with a significantly higher input resistance during the OFF times of the pulses than during the pulse ON times, whereby any tendency for said operational amplifier to drift is reduced.

5. The converter according to claim 4 further including means responsive to the input pulses for providing a series of reset pulses at a predetermined repetition rate, and a reset switch connected in shunt with said capacitive means and responsive to each of said reset pulses for discharging said capacitive means, whereby a series of ramp like signals is provided.

6. The converter apparatus according to claim 4 wherein said switch means includes a field effect transistor having a source-drain circuit connected in parallel with said second resistive means and a gate electrode maintained at a constant voltage level; said field effect transistor being switched into conduction in response to said input pulses and out of conduction in the absence of said input pulses, thereby varying the effective resistance of said second resistive means to provide negligible resistance in the presence of an input pulse and substantial resistance in the absence of such a pulse.

7. The converter according to claim 6 further including a transistor having a base electrode connected to receive said input pulses and a collector electrode connected to a voltage divider having a junction coupled to said first resistive means, and wherein the voltage divider is selected so that the voltage applied to the source electrode of said field effect transistor during the ON times of said input pulses is substantially equal to the voltage at which the gate electrode is maintained.

8. The converter according to claim 4, including means for discharging said capacitor to reset said converter.

9. The converter according to claim 4 wherein said input pulses have a predetermined frequency; and further including a frequency divider means responsive to said input pulses for producing a second train of pulses at a selected repetition rate, and a gate means having one input coupled to receive said input pulses, another input coupled to receive said second train of pulses and an output coupled to said first resistive means, whereby said input pulses are periodically applied to said operational amplifier in bursts occurring at said selected frequency.

* * * * *

UNITED STATES PATENT AND TRADEMARK OFFICE

CERTIFICATE OF CORRECTION

PATENT NO. : 3,918,046

DATED : November 4, 1975

INVENTOR(S) : Roy W. Rivers

It is certified that error appears in the above-identified patent and that said Letters Patent are hereby corrected as shown below:

Column 3, line 53, eliminate "multiplexed by the number of input pulses"

Column 3, line 61, after "reduce" insert "the drift"

Column 5, line 46, change "varried" to "varied"

Signed and Sealed this

Twenty-fourth Day of August 1976

[SEAL]

*Attest:*

RUTH C. MASON
*Attesting Officer*

C. MARSHALL DANN
*Commissioner of Patents and Trademarks*